United States Patent

Takahashi

[11] Patent Number: 5,809,193
[45] Date of Patent: Sep. 15, 1998

[54] OPTICAL DEVICE HAVING A SLANT CONNECTING END SURFACE

[75] Inventor: Mitsuo Takahashi, Matsudo, Japan

[73] Assignee: Seikoh Giken Co., Ltd., Matsudo, Japan

[21] Appl. No.: 767,414

[22] Filed: Dec. 16, 1996

[30] Foreign Application Priority Data

Jul. 23, 1996 [JP] Japan .................................. 8-212972

[51] Int. Cl.$^6$ ...................................................... G02B 6/36
[52] U.S. Cl. ................................ 385/79; 385/61; 385/72; 385/78; 385/85
[58] Field of Search .................................. 385/79, 22, 33, 385/34, 45, 60, 61, 72, 74, 78, 85

[56] References Cited

U.S. PATENT DOCUMENTS 5,359,683 10/1994 Pan ............................................. 385/22

FOREIGN PATENT DOCUMENTS 2 031 183 4/1980 United Kingdom .
2 141 256 12/1984 United Kingdom .
2 253 073 8/1992 United Kingdom .

*Primary Examiner*—Phan T. H. Palmer
*Attorney, Agent, or Firm*—Spencer & Frank

[57] ABSTRACT

An optical device having at least one slant optical connecting interface is disclosed. The optical device comprises a ferrule assembly, a GRIN rod lens assembly and a means for aligning the interface. The ferrule assembly comprises a pair of optical fibers with the distal ends thereof inserted symmetrically with respect to a reference line in a main body thereof, an aligning reference surface constituted by two surfaces which are provided on the outer periphery of the main body, and an end surface composed of the optical fibers and a main body end surface which have been polished to a slant surface. The GRIN rod lens assembly comprises of a GRIN rod lens, an aligning sleeve supporting the GRIN rod lens, an aligning reference surface which is constituted by two surfaces which are provided on the outer periphery of the aligning sleeve, and an end surface which has been formed by polishing the GRIN rod lens to a slant surface. The means for aligning aligns the reference line of the ferrule assembly with the optical axis of the GRIN rod lens assembly.

14 Claims, 5 Drawing Sheets

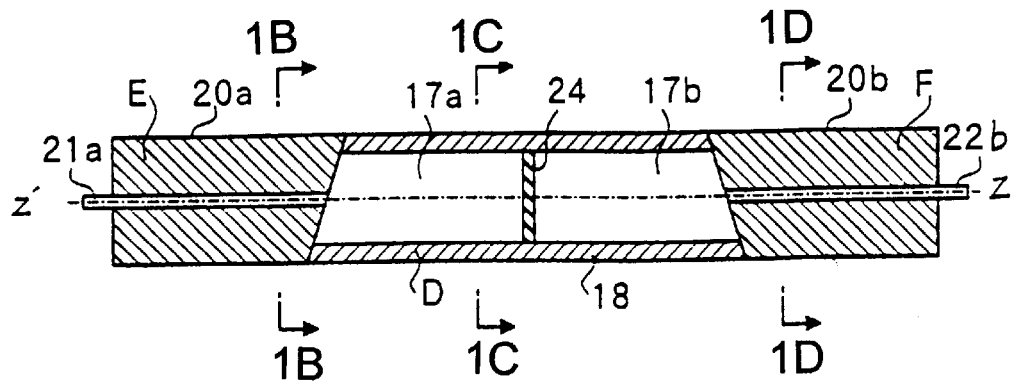
FIG. 1A
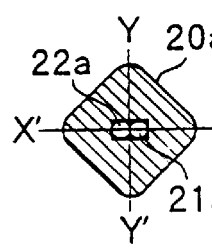
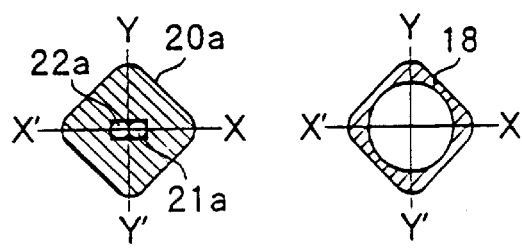
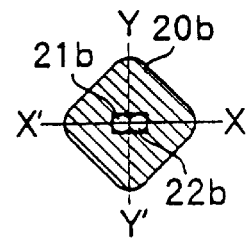
FIG. 1B    FIG. 1C    FIG. 1D
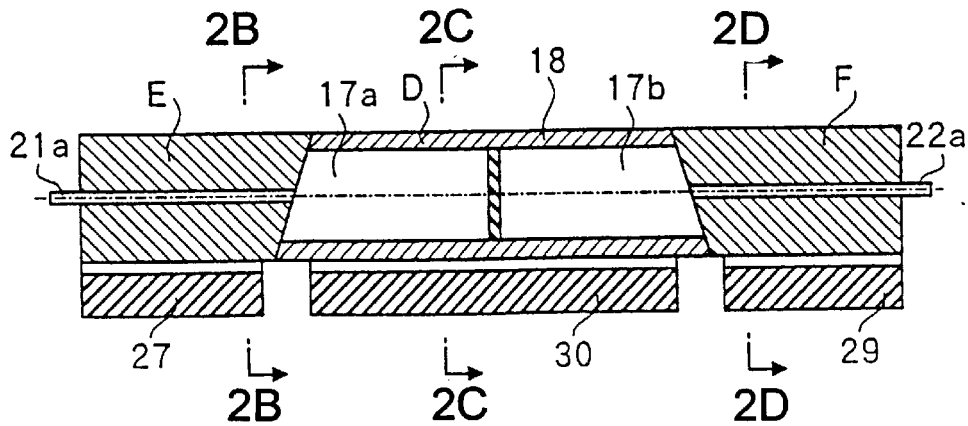
FIG. 2A
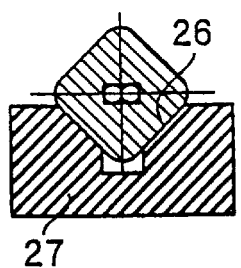
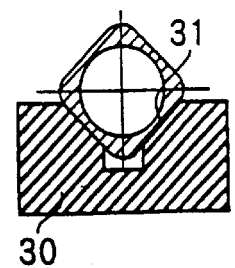
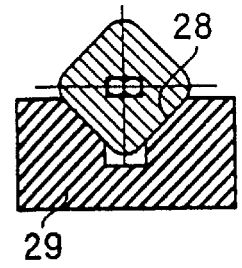
FIG. 2B    FIG. 2C    FIG. 2D FIG. 3A
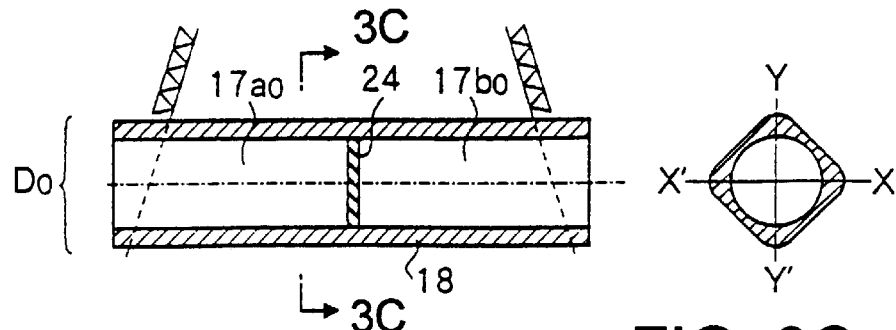
FIG. 3C
FIG. 3B
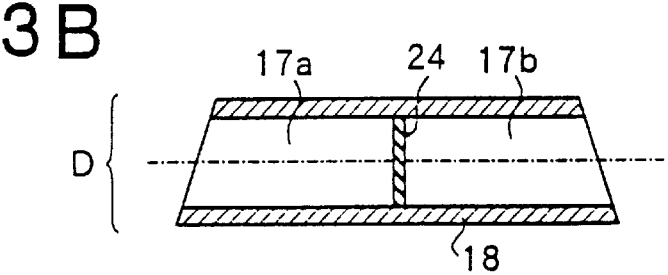
FIG. 4A
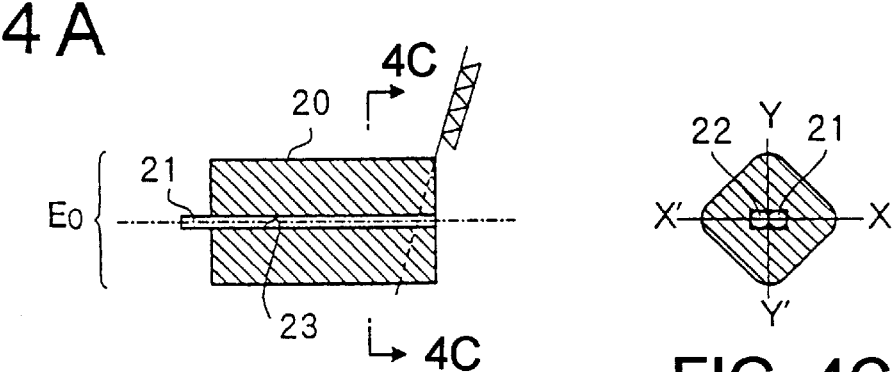
FIG. 4C
FIG. 4B
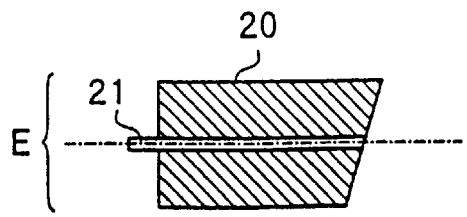

FIG. 5A
FIG. 5B
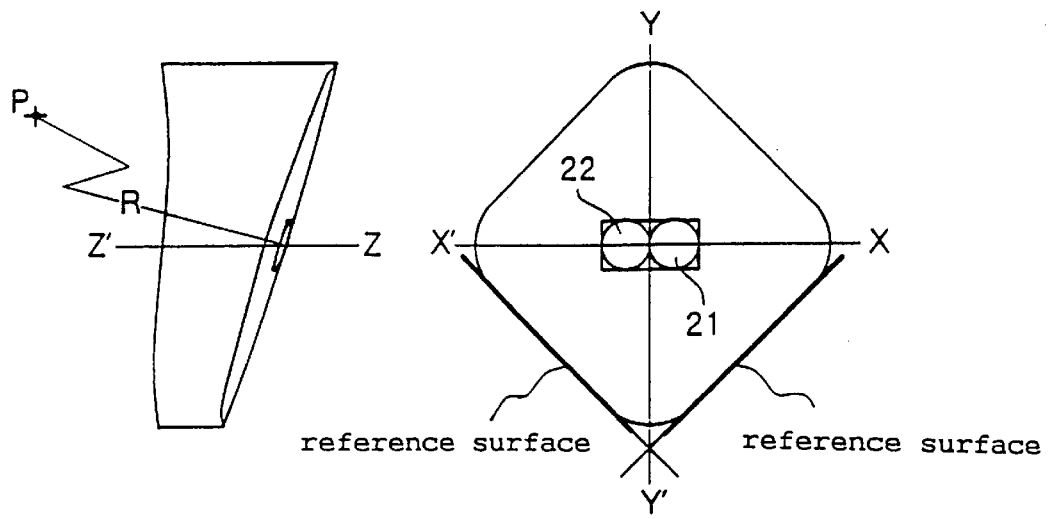
FIG. 6A
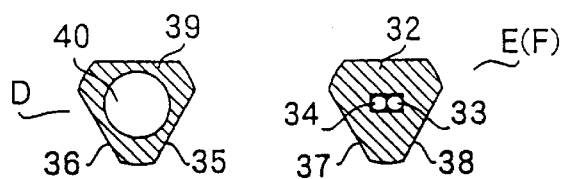
FIG. 6B

FIG. 7A  PRIOR ART
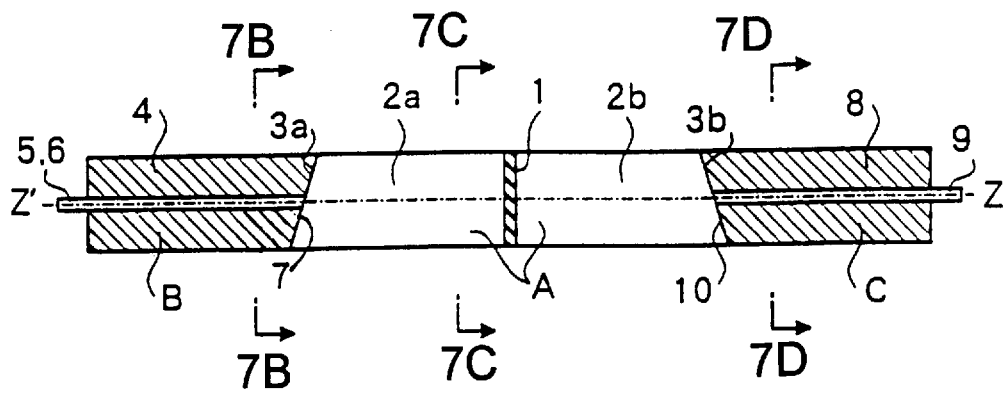
FIG. 7B    FIG. 7C    FIG. 7D
FIG. 8
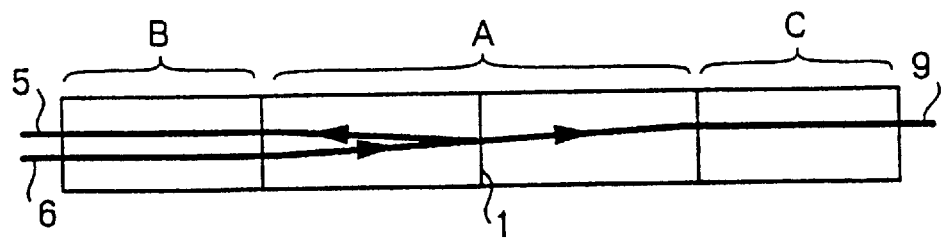
PRIOR ART

FIG. 9A
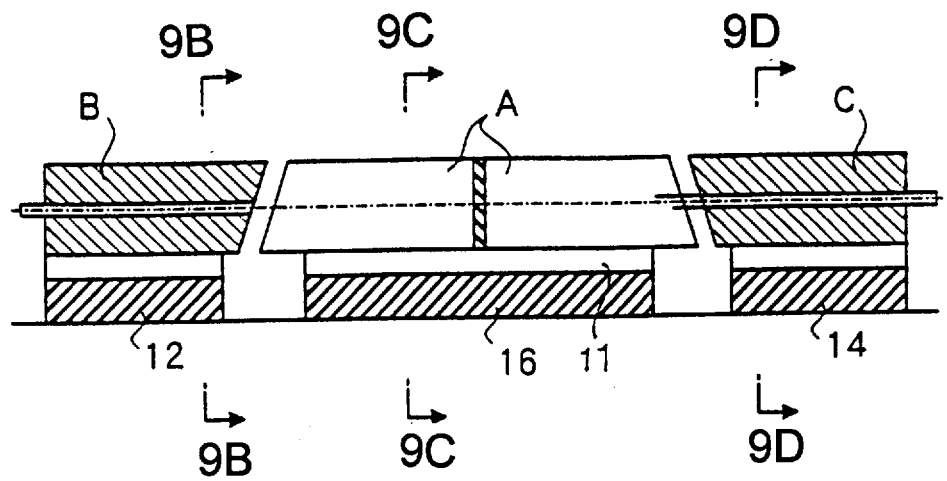
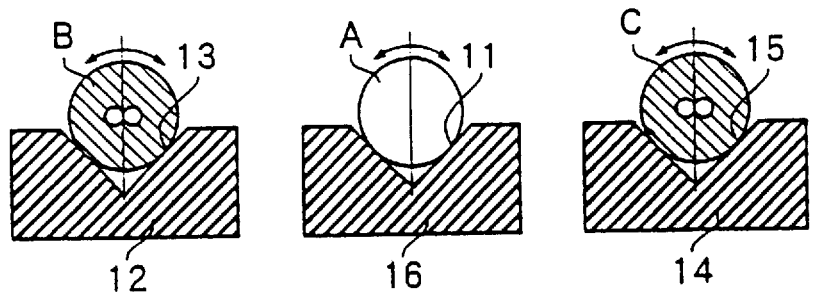
FIG. 9B  FIG. 9C  FIG. 9D
PRIOR ART

OPTICAL DEVICE HAVING A SLANT CONNECTING END SURFACE

BACKGROUND OF THE INVENTION

1. Field of the Invention

The present invention relates to an optical device which employs optical fibers and GRIN (graded index) rod lenses which are connected to each other and, more particularly, to an optical device having a slant connecting end surface which is inclined with respect to a surface at right angles to the optical axis of optical fibers in order to reduce a harmful reflected return light beam which is fed back to a light source from the connecting end surface in, for example, a 1×2 branch coupler.

2. Description of Related Art

In an optical device having slant connecting end surfaces, it is required to accurately connect and adjust the connecting end surfaces so as to prevent rotational angle dephasing of the slant end surfaces or misaligned optical axes. For this reason, such adjustment is generally performed using a 4-axis aligning apparatus. The aforesaid adjustment, however, is not easy; it requires skill and prolonged assembling and adjusting time.

The configuration and problems of a prior art optical device having slant connecting end surfaces will be described in conjunction with FIG. 7 through FIG. 9.

FIG. 7 shows sectional views of a reference example wherein a constituent element of an optical device equipped with slant connecting end surfaces has a cylindrical outer peripheral surface; FIG. 8 is a diagram showing an optical path of the reference example shown in FIG. 7; and FIG. 9 shows sectional views illustrative of the assembling and adjusting process for the reference example shown in FIG. 7.

In the drawings, reference character A denotes a GRIN rod lens assembly comprised of two GRIN rod lenses 2a and 2b and a mirror 1, the reflectance and transmittance of which are both 50%. A ferrule assembly B at the reflecting end supports optical fibers 5 and 6 at the center thereof; and a ferrule assembly C at the transmitting end supports an optical fiber 9. The two ferrules assemblies B and C have cylinders 4 and 8, respectively, the outside peripheries of which have the same diameter as that of the GRIN rod lens assembly.

The optical device which employs the optical fibers and the GRIN rod lenses which are connected as shown in FIG. 7 is an optical branch coupler of a 1×2 circuit which has a branching ratio of 50 to 50. As illustrated in FIG. 8, a part of the light beam input through the optical fiber 6 of the ferrule assembly B at the reflecting end passes through the translucent mirror 1 of the GRIN rod lens assembly A and is taken out through the optical fiber 9 of the ferrule assembly C at the transmitting end; the light beam reflected by the translucent mirror 1 of the GRIN rod lens assembly A is taken out through the optical fiber 5 of the ferrule assembly at the reflecting end. End surfaces 3a and 3b of the GRIN rod lens assembly have been polished and formed to planes which are inclined at 8 degrees with respect to the surface at right angles to an optical axis ZZ'. Accordingly, the ferrule assembly B at the reflecting end and the ferrule assembly C at the transmitting end have been polished and formed to planes which are inclined 8 degrees with respect to the surface which is at right angles to the optical axis ZZ'. These slant end surfaces reduce the loss caused by the reflection at the connecting surfaces.

The assembling and adjusting procedure for the aforesaid assemblies will now be described in conjunction with FIG. 9.

The top surface of a fixing table 16 of an adjusting apparatus is provided with a V-groove 11 for aligning and installing the GRIN rod lens assembly A. The top surface of a 4-axis movable table 12 is provided with a V-groove 13 for aligning and installing the ferrule assembly B at the reflecting end; likewise, the top surface of another 4-axis movable table 14 is provided with a V-groove 15 for aligning and installing the ferrule assembly C at the transmitting end.

Firstly, the GRIN rod lens assembly A is mounted in the V-groove 11 for aligning and installing. At this time, the GRIN rod lens assembly A is rotated to adjust it so that the orientation of the slant surfaces are nearly matched with an axis YY'(FIG. 7C). Secondly, the ferrule assemblies B and C are mounted in the aligning V-grooves 13 and 15 in the same manner. After all the assemblies are mounted as illustrated in FIG. 9, the other ends of the respective optical fibers are connected to a light source and an optical power meter (not shown). In order to minimize optical loss, the ferrule assembly B is rotated to adjust it so that a slant end surface 7 is brought in close contact with the slant end surface 3a of the GRIN rod lens assembly A and also the two optical fibers 5 and 6 are precisely positioned symmetrically so that S1=S2 as shown in FIG. 7B in relation to the optical axis ZZ' before connecting the ferrule assembly B to the GRIN rod lens 2a. In a similar manner, the ferrule assembly C at the transmitting end is also rotated to adjust it such that a slant end surface 10 is brought in close contact with the slant end surface 3b of the GRIN rod lens assembly A and also the optical fiber 9 is precisely positioned symmetrically so that S1=S2=S3 as shown in FIGS. 7B and 7C in relation to the optical axis ZZ' before connecting the ferrule assembly C to the GRIN rod lens 2b.

The optical branch coupler described above poses the following manufacturing problems:

1. As illustrated, the slant surfaces of the respective ferrules must be formed and polished into planes which are tilted by a predetermined angle, e.g. 8 degrees, with respect to the axis X—X' in the disposing direction of the two optical fibers 5 and 6. If, however, cylindrical ferrules are used, no reference surface is available for polishing; therefore, an angle phase setting part such as a flange which provides the polishing reference surface is required to be installed and adjusted in advance, resulting in the need to expend many man-hours of skilled labor and a complicated work procedure. Despite such efforts, the accuracy obtained is unsatisfactory.

2. If GRIN rod lenses, in which slant surfaces have already been formed, are used, the angle phases of the respective slant surfaces of the two GRIN rod lenses are generally adjusted by aligning V-grooves. The GRIN rod lenses, however, are extremely small (the diameter ranges from 1.8 to 2.0 mm and the length is about 5 mm); therefore, the work efficiency is low, skill is required, and the accuracy is unsatisfactory.

3. The precise core adjustment performed by the 4-axis aligning table requires that the angle dephasing of the slant surfaces of the parts be roughly corrected to ±10 degrees or less before the parts are fitted in the aligning V-grooves. The parts are not equipped with aligning reference surfaces for restricting the orientations of the slant surfaces, so that many man-hours are required.

Thus, there have been several inconveniences and problems in the aspects of productivity and quality.

SUMMARY OF THE INVENTION

Accordingly, the optical device is an object of the present invention to provide an optical device for slant surface connection, which optical device has been improved to permit easy assembly so that even unskilled persons can easily assemble it.

To this end, according to one aspect of the present invention, there is provided an optical device having a slant connecting end surface which is equipped with:

a ferrule assembly comprised of a pair of optical fibers with the distal ends thereof inserted symmetrically with respect to a reference line in the main body of the ferrule assembly, an aligning reference surface constituted by two surfaces which are provided on the outer periphery of the main body so that they are parallel to the aforesaid reference line and that they intersect with each other, and an end surface composed of the optical fibers and the main body end surface which have been polished to form a slant surface inclined with respect to the aligning direction line of the optical fibers by using the aforesaid aligning reference surface as the reference therefor;

a GRIN rod lens assembly composed of a GRIN rod lens, an aligning sleeve supporting the GRIN rod lens, an aligning reference surface which is constituted by two surfaces which are provided on the outer periphery of the aligning sleeve so that they are parallel to the optical axis of the GRIN rod lens and that they intersect with each other, and an end surface which has been formed by polishing the GRIN rod lens to a slant surface by using the aligning reference surface as the reference therefor; and means for aligning the reference line of the ferrule assembly with the optical axis of the GRIN rod lens assembly and for connecting and supporting the slant surface of the ferrule assembly and the slant surface of the GRIN rod lens assembly.

According to another aspect of the present invention, there is provided an optical device which is composed of: a first ferrule assembly constituted by a pair of optical fibers having the distal ends thereof symmetrically inserted in a central plane which includes a reference line in a main body, an aligning reference surface composed of two surfaces that are provided on the outer periphery of the main body so that they are parallel to the reference line and that they intersect with each other, and an end surface composed of the optical fibers and a main body end surface which have been polished to a slant surface inclined with respect to the aligning direction line in the central plane of the optical fibers by using the aforesaid aligning reference surface as the reference therefor;

a second ferrule assembly which has the same shape as the aforesaid ferrule assembly and which includes an optical fiber associated with at least one of the aforesaid optical fibers;

a GRIN rod lens assembly constructed by a GRIN rod lens, an aligning sleeve supporting the GRIN rod lens, an aligning reference surface which is constituted by two surfaces which are provided on the outer periphery of the aligning sleeve so that they are parallel to the optical axis of the GRIN rod lens and that they intersect with each other, and an end surface which has been formed by polishing the GRIN rod lens into a slant surface by using the aligning reference surface as the reference therefor; and means for aligning the reference lines of the ferrule assemblies with the optical axis of the GRIN rod lens assembly, for aligning the central planes of the respective ferrules, and for connecting and supporting the slant surfaces of the ferrule assemblies and the slant surface of the GRIN rod lens assembly.

In the aforesaid optical device with a slant connecting end surface, the GRIN rod lens assembly has a translucent mirror clamped between the pair of GRIN rod lenses; and the outer ends of the respective GRIN rod lenses have been polished to form slant surfaces. This optical device can be made such that the slant surfaces of the ferrule assemblies may be connected to the respective slant surfaces of the GRIN rod lenses for supporting them so as to constitute a 1×2 branch coupler by one optical fiber of one of the ferrule assemblies and the two optical fibers of the other ferrule assembly.

The slant surfaces of the ferrule assemblies of the aforesaid optical devices may be polished and formed into slant spherical surfaces having the centers thereof in the plane which is orthogonalized with the central plane of the optical fibers and which includes the reference line.

In the optical device, the means for aligning the reference line of the ferrule assembly with the optical axis of the GRIN rod lens assembly and for connecting and supporting the slant surface of the ferrule assembly and the slant surface of the GRIN rod lens assembly may be a means which is adhesively fixed after completing the relative positioning.

In the respective optical devices, the positional relationship between the reference lines and the aligning reference surfaces of the ferrule assemblies may be identical to that between the reference surface and the optical axis of the GRIN rod lens assembly.

BRIEF DESCRIPTION OF THE DRAWINGS

FIGS. 1A, 1B, 1C and 1D show sectional views illustrating an embodiment of an optical device which has slant connecting end surfaces in accordance with the present invention;

FIGS. 2A, 2B, 2C, and 2D show sectional views illustrating an assembling and adjusting process of the embodiment shown in FIGS. 1A to 1D;

FIGS. 3A, 3B and 3C show sectional views illustrating a machining process for a GRIN rod lens assembly which is a constituent element of the embodiment shown in FIGS. 1A to 1D;

FIGS. 4A, 4B and 4C show sectional views illustrating a machining process for a ferrule assembly which is a constituent element of the embodiment shown in FIGS. 1A to 1D;

FIG. 5 shows enlarged views of the distal end surface of the ferrule assembly which is a constituent element of the embodiment shown in FIGS. 1A to 1D, wherein the distal end surface has been polished into a slant spherical surface;

FIGS. 6A and 6B show cross-sectional views of another embodiment of the optical device which has slant connecting end surfaces in accordance with the present invention;

FIGS. 7A, 7B, 7C and 7D show sectional views of a reference example wherein the outer periphery of a constituent element of an optical device which has slant connecting end surfaces is composed of a cylindrical surface;

FIG. 8 is a diagram illustrative of an optical path of the reference example shown in FIGS. 7A to 7D; and FIGS. 9A, 9B, 9C and 9D show sectional views illustrating the assembling and adjusting process of the reference example shown in FIGS. 7A to 7D.

DESCRIPTION OF THE PREFERRED EMBODIMENTS

The present invention will be described in more detail with reference to the accompanying drawings. FIGS. 1A, 1B, 1C and 1D show sectional views illustrating an embodiment of an optical device which has slant connecting end surfaces in accordance with the present invention.

In the drawing, reference character D denotes a GRIN rod lens assembly composed of two GRIN rod lenses 17a and 17b and a mirror 24; the mirror 24 has 50% reflectance and 50% transmittance. Reference character E denotes a ferrule assembly at the reflecting end which supports optical fibers 21a and 22a at the center thereof; and reference character F denotes a ferrule assembly at the transmitting end which supports optical fibers 21b and 22b. The two ferrule assemblies E and F are shaped like rectangular cylinders 20a and 20b, the outer peripheries of which have been chamfered as in the case of the GRIN rod lens assembly D.

The optical device which combines the optical fibers and the GRIN rod lenses shown in FIGS. 1A to 1D can be used as an optical branch coupler of a 1×2 circuit which has a branching ratio of 50 to 50.

A part of a light beam input through the optical fiber 21a of the ferrule assembly E at the reflecting end passes through the translucent mirror 24 of the GRIN rod lens assembly D and is taken out through the optical fiber 21b of the ferrule assembly F at the transmitting end, while the light beam reflected by the translucent mirror 24 of the GRIN rod lens assembly D is taken out through the optical fiber 22a of the ferrule assembly E on the reflecting end. The end surfaces of the GRIN rod lens assembly have been polished to form slant planes which are inclined 8 degrees with respect to a surface at right angles to the optical axis Z—Z', an axis X—X' being the center therefor. Accordingly, the ferrule assembly E at the reflecting end and the ferrule assembly F at the transmitting end have also been polished to form slant planes which are inclined 8 degrees with respect to the surface at right angles to the optical axis Z—Z', the axis X—X' being the center therefor. This reduces the loss caused by the reflection at the connecting surfaces as in the case of the reference example described above.

FIGS. 2A, 2B, 2C and 2D show sectional views illustrating the assembling and adjusting process of the embodiment shown in FIGS. 1A to 1D; FIGS. 3A, 3B and 3C show sectional views illustrating a machining process for the GRIN rod lens assembly which is a constituent element of the embodiment shown in FIGS. 1A to 1D; and FIGS. 4A, 4B and 4C show sectional views illustrating a machining process for a ferrule assembly which is a constituent element of the embodiment shown in FIGS. 1A to 1D.

FIG. 3A shows a GRIN rod lens assembly $D_0$ having cylindrical GRIN rod lenses 17ao and 17bo before the slant surfaces thereof are formed by polishing. The mirror 24 has a reflectance of 50% and a transmittance of 50%.

The mirror 24 is held vertically between cylindrical GRIN rod lenses 17ao and 17bo; it is inserted together with the GRIN rod lenses in an aligning sleeve 18 which has a nearly rectangular cross section. As illustrated in FIG. 3B, both end surfaces are polished to form slant planes which are inclined 8 degrees, thus forming the GRIN rod lens assembly D having cylindrical GRIN rod lenses 17a and 17b. In this case, the two intersecting surfaces of the rectangular outer periphery are used as the polishing reference surfaces to form one end surface of the GRIN rod lens to the slant surface, then the other end surface thereof also to the slant surface. This prevents the slant surface angle dephasing on each end surface. In this embodiment, a machined glass bar has been used for the aligning sleeve 18.

FIG. 4A shows a ferrule assembly material $E_0$ before an end surface is polished and formed to be a slant surface. A ferrule 20 is produced by injection-molding polycarbonate resin; it has a chamfered rectangular section and also has a rectangular hole 23 in which two optical fibers 21 and 22 (FIG. 4C) are inserted and fixed side by side in close contact at the center thereof. The two optical fibers 21 and 22 are closely inserted and fixed side by side in the rectangular hole 23 to constitute the ferrule assembly material $E_0$. FIG. 4B shows the ferrule assembly E which has been subject to the polishing process for forming the slant surface which is inclined 8 degrees with the axis X—X' used as the center therefor.

The slant surface has been polished to form a slant spherical surface by using, as the polishing reference surfaces, the two surfaces of the rectangular outer periphery which intersect with each other at right angles. The slant surface of the ferrule assembly provides the slant connecting end surface which is a slant spherical surface having the center thereof in a plane that is orthogonalized with the aligning direction line of the optical fiber and that includes the reference line. The ferrule assembly E at the reflecting end and the ferrule assembly F at the transmitting end share the same structure.

FIGS. 2A to 2D shows the process for mounting the aforesaid respective assemblies D, E, and F on a three-axis aligning table to assemble them.

A fixing table 30 is provided with an aligning V groove 31 on the top surface thereof. The two orthogonalized surfaces of the outer periphery of the GRIN rod lens assembly D are fitted and fixed in the aligning V groove 31.

A three-axis aligning table 27 is provided with an aligning V groove 26 on the top surface thereof. The two orthogonalized surfaces of the outer periphery of the ferrule assembly E are fitted and fixed in the aligning V groove 26.

The orientation of the slant surface of the ferrule assembly E precisely agrees with the orientation of the slant surface of the GRIN rod lens assembly D without performing any adjustment.

A three-axis aligning table 29 is provided with an aligning V groove 28 on the top surface thereof; the aligning groove 28 supports the ferrule assembly F at the transmitting end. The two orthogonalized surfaces of the outer periphery of the ferrule assembly F are fitted and fixed in the aligning V groove 28.

The orientation of the slant surface of the ferrule assembly F precisely agrees with the orientation of the slant surface of the GRIN rod lens assembly D without performing any adjustment.

The relative positions of the assemblies D, E, and F are adjusted using a light source and a power meter, not shown, and are then adhesively fixed in optimum positions.

The end surfaces of the ferrule assemblies E and F are polished to form slant spherical surfaces for the following reasons:

When polishing planes to form slant surfaces, variations in slant angle inevitably result and harmful gaps are produced between the respective connecting end surfaces when the slant planes are matched to align the optical axes. To avoid this, one connecting end surface is spherically formed so as to prevent air gaps from being formed between an optical fiber and a contact surface or point.

FIGS. 5A and 5B show an enlarged views of the end surface of a ferrule which has been polished to the slant spherical surface. The distal ends of the paired optical fibers 21 and 22 have been inserted and fixed symmetrically in a central plane, i.e. XZ plane, which includes the reference line Z—Z' in the main body. Center P of the spherical surface lies in a YZ plane.

FIGS. 6A and 6B show cross-sectional views of an assembly which is a constituent element of another optical device which has the slant connecting end surfaces in accordance with the present invention. FIG. 6A shows the cross section of the GRIN rod lens assembly D; and FIG. 6B shows the cross section of the ferrule assembly E or F.

An aligning sleeve 39 and a ferrule 32 are shaped like chamfered equilateral triangular columns. Inserted and fixed in the ferrule 32 are optical fibers 33 and 34; and inserted and fixed in the aligning sleeve 39 are two GRIN rod lenses 40 and a mirror, which is not shown. The aligning sleeve 39 has polishing and aligning reference surfaces 35 and 36, and the ferrule 32 also has polishing and aligning reference surfaces 37 and 38.

Thus, the optical device in accordance with the present invention is capable of constituting a 1×2 optical branch coupler. Moreover, using, for example, total reflection mirrors for all of the incorporated mirrors enables the optical device to serve also as a connector.

In the optical device which has the slant connecting end surfaces according to the present invention, the outer surfaces of the components are provided with the polishing reference surfaces used for forming the slant end surfaces; the polishing reference surfaces provide the aligning reference surfaces used for assembling the components; and the aligning reference surfaces are fitted in the aligning grooves formed on the tables for aligning the cores. This arrangement has achieved appreciably easier assembling and improved quality over a conventional optical device of a similar type.

It is apparent that the embodiments which have been described in detail above can be modified in a wide range on the basis of this invention without departing from the spirit and scope of the invention. For instance, there is a wide selection of materials including glass, ceramic, metal, and plastic moldings for the ferrules and aligning sleeves used in the optical device of the present invention so as to ensure optimum selections for individual applications. Further, the ferrules and aligning sleeves may be of any desired external cylindrical shapes as long as they have two reference planes.

What is claimed is:

1. An optical device with a slant connecting end surface comprising:
    a ferrule assembly including
        a pair of optical fibers, distal ends thereof being inserted symmetrically with respect to a reference line in a main body of said ferrule assembly;
        an aligning reference surface having two portions provided on the outer periphery of said main body so that they are parallel to said reference line and intersect each other; and
        an end surface composed of said optical fibers and a main body end surface polished to form a slant surface inclined with respect to an aligning direction line of said optical fibers by using said aligning reference surface as a reference therefor;
    a GRIN rod lens assembly including
        a GRIN rod lens;
        an aligning sleeve supporting said GRIN rod lens, said aligning sleeve having an aligning reference surface having two portions provided on an outer periphery of said aligning sleeve so that they are parallel to an optical axis of said GRIN rod lens and intersect each other; and
        an end surface formed by polishing said GRIN rod lens to a slant surface by using said aligning reference surface as a reference therefor; and
    means for aligning the reference line of said ferrule assembly with the optical axis of said GRIN rod lens assembly and for connecting and supporting the slant surface of said ferrule assembly and the slant surface of the GRIN rod lens assembly.

2. An optical device according to claim 1, wherein the slant surface of said ferrule assembly is polished and formed into a slant spherical surface having a center thereof lying in a plane which is orthogonal to a central plane of said pair of optical fibers and which includes the reference line.

3. An optical device according to claim 1 wherein the main body of said ferrule assembly and the aligning sleeve of said GRIN rod lens assembly have substantially rectangular cross sections.

4. An optical device according to claim 1 wherein the main body of said ferrule assembly and the aligning sleeve of said GRIN rod lens assembly have substantially triangular cross sections.

5. An optical device according to claim 1, wherein said means for aligning the reference line of said ferrule assembly with the optical axis of said GRIN rod lens assembly and for connecting and supporting the slant surface of said ferrule assembly and the slant surface of said GRIN rod lens assembly is means which is adhesively fixed after completing relative positioning.

6. An optical device according to claim 1, wherein a positional relationship between the reference line and the aligning reference surface of said ferrule assembly is identical to a relationship between the optical axis and the reference surface of said GRIN rod lens assembly.

7. An optical device comprising:
    a first ferrule assembly including
        a first main body having a first central plane and a first reference line located in said first central plane, said first reference line extending longitudinally within said first main body, an outer periphery of said first main body including first and second intersecting aligning reference surfaces extending parallel to said first reference line; and
        a pair of optical fibers positioned within said first main body, said pair of optical fibers being symmetrically located with respect to said first reference line and within said first central plane, distal ends of said pair of optical fibers and an end surface of said first main body being polished to form a first slant surface inclined with respect to an aligning direction line in said first central plane by means of the first and second intersecting aligning reference surfaces of said first main body;
    a second ferrule assembly including
        a second main body having a second central plane and a second reference line located in said second central plane, said second reference line extending longitudinally within said second main body, an outer periphery of said second main body including first and second intersecting aligning reference surfaces extending parallel to said second reference line; and
        at least a third optical fiber positioned within said second main body, a distal end of said third optical fiber and an end surface of said second main body being polished to form a second slant surface inclined with respect to an aligning direction line in said second central plane by means of the first and second intersecting aligning reference surfaces of said second main body;

a GRIN rod lens assembly including
  a GRIN rod lens having an optical axis; and
  an aligning sleeve supporting said GRIN rod lens, an outer periphery of said aligning sleeve including first and second intersecting aligning reference surfaces extending parallel to said optical axis, an end surface of said GRIN rod lens being polished to form a slant surface by means of the first and second intersecting aligning reference surfaces of said aligning sleeve; and means for aligning the first and second reference lines of said first and second ferrule assemblies with the optical axis of said GRIN rod lens assembly, for aligning the central planes of said first and second ferrule assemblies, and for connecting and supporting the slant surfaces of said respective first and second ferrule assemblies with the slant surface of said GRIN rod lens assembly.

8. An optical device according to claim 7, wherein said means for aligning the reference lines of said first and second ferrule assemblies with the optical axis of said GRIN rod lens assembly and for connecting and supporting the slant surfaces of said first and second ferrule assemblies and the slant surface of said GRIN rod lens assembly is means which is adhesively fixed after completing relative positioning.

9. An optical device according to claim 7, wherein a positional relationship between the first and second reference lines and the first and second aligning reference surfaces of said first and second ferrule assemblies respectively is identical to a relationship between the optical axis and the reference surface of said GRIN rod lens assembly.

10. An optical device according to claim 7, wherein the slant surface of each of said first and second ferrule assemblies is polished and formed into a slant spherical surface having a center thereof lying in a plane which is orthogonal to a central plane of an optical fiber and which includes a reference line.

11. An optical device according to claim 7 wherein said GRIN rod lens assembly further includes a translucent mirror clamped between first and second GRIN rod lenses, outer ends of said first and second GRIN rod lenses being polished to form first and second slant surfaces; and wherein the slant surfaces of said first and second ferrule assemblies are connected to the first and second slant surfaces of said first and second GRIN rod lenses respectively for supporting said first and second GRIN rod lenses, whereby a 1×2 branch coupler including said third optical fiber of said second ferrule assembly and the pair of optical fibers of said first ferrule assembly is formed.

12. An optical device according to claim 7 wherein said second ferrule assembly further includes a fourth optical fiber, said third and fourth optical fibers being positioned within said second main body and symmetrically located with respect to said second reference line and within said second central plane, distal ends of said third and fourth optical fibers and an end surface of said second main body being polished to form a second slant surface inclined with respect to an aligning direction line in said second central plane by means of the first and second intersecting aligning reference surfaces of said second main body.

13. An optical device according to claim 7 wherein the main bodies of said first and second ferrule assemblies and the aligning sleeve of said GRIN rod lens assembly have substantially rectangular cross sections.

14. An optical device according to claim 7 wherein the main bodies of said first and second ferrule assemblies and the aligning sleeve of said GRIN rod lens assembly have substantially triangular cross sections.

* * * * *